United States Patent [19]

Eklund

[11] Patent Number: 4,821,596

[45] Date of Patent: Apr. 18, 1989

[54] ROTATOR

[76] Inventor: Erik Eklund, Klövervägen 15, 161 36 Bromma, Sweden

[21] Appl. No.: 154,149

[22] Filed: Feb. 9, 1988

[30] Foreign Application Priority Data

Feb. 25, 1987 [SE] Sweden ................................ 8700804

[51] Int. Cl.[4] ........................ G05G 11/00; H01Q 3/08; F16H 25/24

[52] U.S. Cl. ...................................... 74/479; 74/89.15; 74/425; 248/183; 343/766; 343/882

[58] Field of Search ..................... 74/89.14, 89.15, 425, 74/479; 248/183; 343/766, 882

[56] References Cited

U.S. PATENT DOCUMENTS

| | | | |
|---|---|---|---|
| 3,515,015 | 6/1970 | Gilbert | 248/183 X |
| 3,864,984 | 2/1975 | Legille | 74/425 X |
| 4,691,207 | 9/1987 | Timineri | 343/822 X |
| 4,719,810 | 1/1988 | St. Cyr et al. | 74/89.15 |

FOREIGN PATENT DOCUMENTS

| | | | |
|---|---|---|---|
| 60-180204 | 9/1985 | Japan | 343/882 |

*Primary Examiner*—Allan D. Herrmann

*Attorney, Agent, or Firm*—Silverman, Cass, Singer & Winburn, Ltd.

[57] ABSTRACT

A rotator comprises a gear housing which has a lower attachment for fitting the housing to the top of a mast, and which has extending therefrom a tube which can be rotated about its longitudinal axis relative to the gear housing by means of a gear therein, this tube being intended to carry a top sleeve, which in turn is intended to carry an aerial. The invention is characterized in that an upper attachment (3) is mounted on the outer end of the tube (5); in that the upper attachment (3) includes a lower part (6) which is connected firmly to the tube (5) and an upper part (4) which is hinged to the lower part (6); in that the tube (5) has located therewithin a rod (10) or like element which can be moved in the direction of the tube axis and the upper end of which rod (10) is attached to the upper part (7) of the upper attachment (3), such that when the rod (10) is moved axially the angle defined by the two attachment parts (6, 7) with said longitudinal axis is changed; and in that the gear housing has provided therein activating means (18, 19, 26, 27) for displacing the rod (10) axially relative to the gear housing (1), therewith enabling a top sleeve (4) attached to the upper part (7) of the upper attachment (3) to be brought to a pre-determined angle with the tube (5) and enabling this angle to be maintained during rotation of the tube about its longitudinal axis.

5 Claims, 1 Drawing Sheet

ROTATOR

The present invention relates to a rotator for revolving aerial masts. Primarily, the present invention relates to a cable or chain operated rotator which has twin functions and the top sleeve or socket of which is so configured as to enable an aerial mounted therein to be aligned directionally in the horizontal plane through an angle of 360° and to enable the aerial to be tilted to an angle of $\pm 12°$ to the horizontal.

Rotators intended for aligning a directional aerial, or antenna, in a desired direction to the horizontal are known to the art. Such rotators normally include a cable or chain operated gear system by means of which a top sleeve is rotated or revolved horizontally, relative to the rotator housing. The rotator housing is mounted on the top of a mast and an aerial is fitted into the top sleeve. Tilting arrangements are also known. These arrangements are configured for fixture to the top sleeve of the rotator and include a further top sleeve, or socket, in which an aerial is fitted. The respective cables or chains by means of which the tilting arrangement and the rotator are operated extend therefrom down to ground level. This cable or chain arrangement is highly troublesome, since the cables serving the tilting arrangement readily wrap around the mast when the rotator is used.

The aforementioned rotator and tilting arrangement are primarily intended for military purposes and the tendency for the operating cables to wrap and to snarl together in the aforesaid manner is highly unsatisfactory.

The known tilting arrangements comprise in principle a lower attachment, which is intended to be secured to the top sleeve of the rotator, and an upper attachment, which is hinged to the upper attachment, and a double-threaded screw mechanism which is located between the upper and lower attachments and which is operated by means of a cable, chain, or like line, such that when extending or retracting the screw mechanism, the angle between the lower and the upper attachment is increased or decreased, i.e. the upper attachment is tilted relative to the lower attachment. The upper attachment secures a top sleeve, into which an aerial may be fitted.

Because the cables, chains and like lines extend to and around the screw mechanism, it is necessary to leave the screw mechanism uncovered and unprotected. Consequently, in difficult weather conditions, snow and ice are liable to cause the tilting arrangement to seize up and therewith render the tilting arrangement inoperative. This necessitates dismantling the mast and cleansing the tilting arrangement from snow and ice.

As will be understood from the aforegoing, known aerial aligning systems require the provision of two separate facilities, i.e. a facility for revolving the aerial and a facility for tilting the aerial.

The present invention relates to a rotator which overcomes the aforesaid drawbacks and by means of which an aerial can be both rotated and tilted.

Thus, the present invention relates to a rotator comprising a gear housing which has a lower attachment for fitting the housing to the top of a mast, and which gear housing has extending therefrom a tube which can be rotated about its longitudinal axis relative to the gear housing by means of a gear therein, said tube being intended to carry a top sleeve, which in turn is intended to carry an aerial, characterized in that an upper attachment is mounted on the outer end of the tube; in that the upper attachment includes a lower part which is connected firmly to the tube, and an upper part which is hinged to the lower part; in that the tube has located therewithin a rod or like element which can be moved in the direction of the tube axis and the upper end of which rod is attached to the upper part of the upper attachment, such that when the rod is moved axially the angle defined by the two attachment parts with said longitudinal axis is changed; and in that the gear housing has provided therein activating means for displacing the rod axially relative to the gear housing, therewith enabling a top sleeve attached to the upper part of the upper attachment to be brought to a pre-determined angle with the tube and enabling this angle to be maintained during rotation of the tube about its longitudinal axis.

As is made more apparent in the following, the rotator and the tilting arrangement are both incorporated in one and the same housing, wherewith both the tilting arrangement and the rotator are well protected against damage from without, and are well able to withstand the climate.

BRIEF DESCRIPTION OF THE DRAWING

The invention will now be described in more detail with reference to an exemplifying embodiment thereof illustrated in the accompanying drawing labelled FIG. 1, which is a longitudinal sectional view of a rotator constructed in accordance with the invention.

Thus, there is shown a rotator which comprises a gear housing 1, which is provided with a lower attachment 2 and an upper attachment 3. The lower attachment 2 is intended to be fitted to the top of a mast. The upper attachment 3 is intended to carry a top sleeve 4, or socket, in which an aerial is intended to be fitted.

Figure 1:
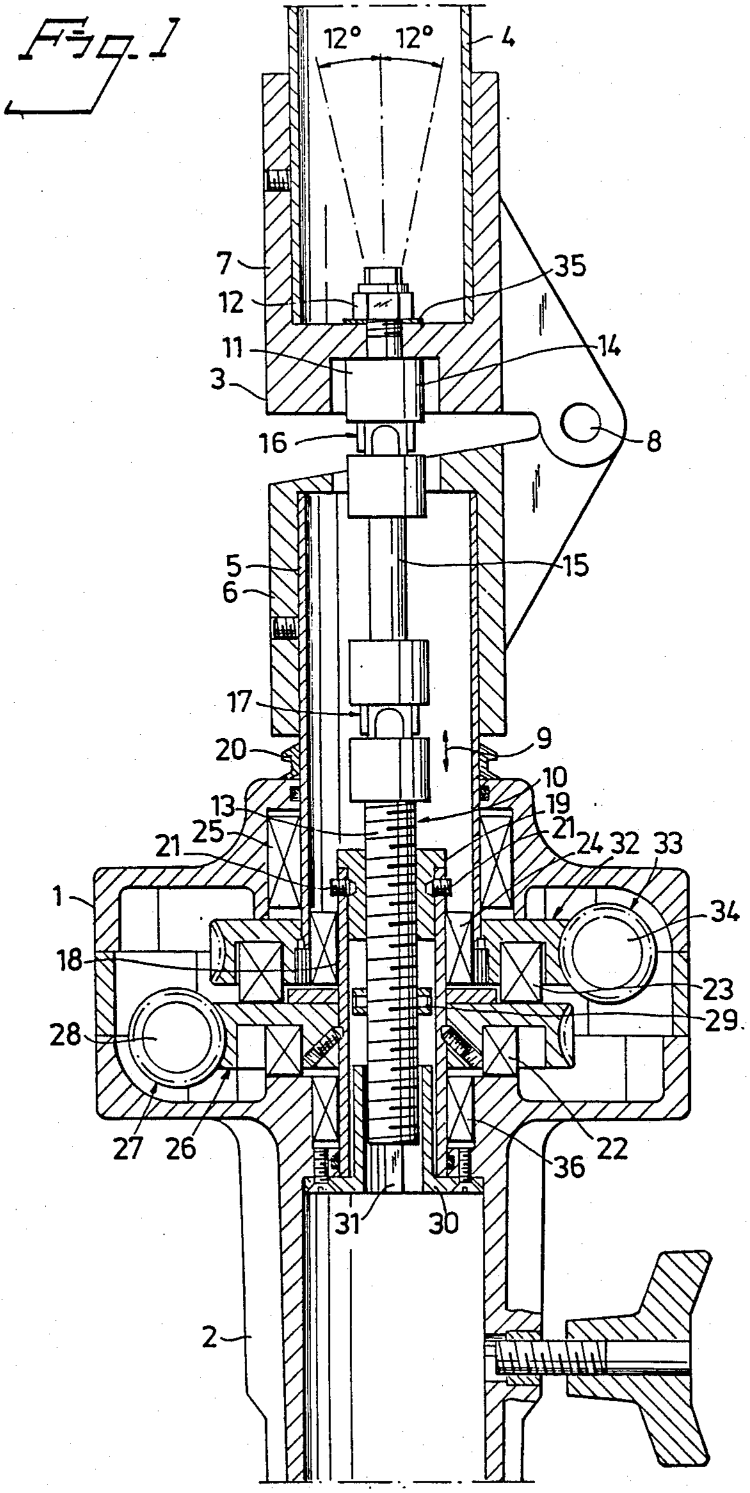

Thus the rotator is intended to be fitted onto the top of a carrier mast, and the aerial can be a directional aerial or a parabolic aerial. The rotator is particularly intended for military purposes, such as to establish communication links, and for signal interception, etc.

Extending from the gear housing 1 is a tube 5 which can be rotated about its main axis relative to the gear housing, by means of a gear in said gear housing. The tube 5 is intended to carry the top sleeve 4, via the upper attachment 3, the top tube thus being rotatable relative to the gear housing 1. The upper attachment 3 includes a lower part 6 which is firmly connected to the tube 5, and an upper part 7 which is hinged to the lower part 6 by means of a hinge 8.

The tube 5 projects into the lower part 6 of the upper attachment 3. Located within the tube 5 is a rod 10 or like element which can be displaced in the direction 9 of the main tube axis. The upper end 11 of the rod 10 is secured to the upper part 7 of the upper attachment 3 by means of a screw joint 12. The upper part 7 can be twisted in relation to the rod 10. Consequently, axial displacement of the rod 10 in the direction of the arrows 9 will result in a change in the angle defined by the two parts 6, 7 of the upper attachment 3 with respective longitudinal axes, in that the upper part 7 is tilted relative to the lower part 6 by means of the hinge 8.

According to one preferred embodiment of the invention, the rod 10 includes a lower part 13 which is secured in the gear housing, an upper part 14 which is attached to the upper part 7 of the upper attachment 3, as beforedescribed, and an intermediate part 15. The rod parts 13, 14, 15 are mutually connected by means of ball couplings 16, 17 or the like, in order to accommodate bending of the rod when the upper part 7 of the upper attachment 3 is tilted relative to the lower part 6.

The inventive aerial rotator also includes an activating device for displacing the rod 10 in the direction of the arrows 9 relative to the gear housing 1. The activating device is housed in the gear housing.

According to one preferred embodiment, the lower part 13 of the rod 10, which is located in the gear housing, is screwthreaded, as indicated in FIG. 1. In this case, the activating device includes an external, rotatable sleeve 18 which is concentrical with the rod 10 and which carries a nut 19. The threads of the nut 19 are intended to cooperate with the threads on the rod. The sleeve 18 is held against axial movement relative to the gear housing 1.

The reference 20 in the drawing identifies a seal, the reference 21 identifies screws, and the references 22, 23, 24, 25 and 26 identify bearings.

According to one embodiment, a worm wheel 26 is attached externally to the sleeve 18, and is rotated by means of a worm screw 27, the shaft 28 of which can be driven by drive means (not shown) so as to rotate the sleeve and displace the rod 10 in the axial direction 9 of said rod.

The lower, screwthreaded part 13 of the rod 10 may have a limit stop 29 fitted thereon, in order to restrict axial movement of the rod 10 in the direction 9. The rod 10 can therewith be displaced between an upper terminal position, in which the limit stop 29 is in abutment with the lower surface of the nut 19, and a lower terminal position, in which the limit stop 29 is in abutment with the upper surface of a guide sleeve 30 located at the lower end of the rod 10.

In the case of the illustrated embodiment of the inventive rotator, this displacement of the rod 10 in the direction of the arrows 9 affords maximum tilting of the upper part 7 of the upper attachment 3 relative to the lower part 6 of the upper attachment through an angle $\pm 12^\circ$, as indicated in the drawing. Naturally, the maximum tilting angle may be different to that mentioned.

In accordance with one embodiment a wedge or like key device 31 is positioned between a groove in the rod 10 and the sleeve 30, in order to prevent the rod 10 from rotating relative to the gear housing.

According to a further preferred embodiment, a worm wheel 32 is connected concentrically with and externally of that part of the tube 5 which is located in the gear housing 1. This worm wheel 32 can be rotated by means of a worm screw 33, the shaft 34 of which is driven by a drive means (not shown) for rotating the tube 5 and therewith the upper attachment. A plain bearing slide 35 is arranged between the rod 10 and the upper part 7 of the upper attachment 3, in order to facilitate rotation of said upper part 7 in relation to the rod 10.

It will be understood from the aforegoing that a top sleeve 4 fitted to the upper part 7 of the upper attachment 3 can be moved to a pre-determined angle to the tube 5, and therewith to the mast, and that this angle can be maintained while rotating the tube 5, and therewith the top sleeve, about their respective main axes.

The illustrated arrangement of the two worm wheels 26, 32, concentrically with and beneath one another, affords a very compact construction in which all the sensitive mechanical components effecting the tilting and rotational movements lie well protected in the gear housing 1.

According to one embodiment, the outer ends of the shafts 28 and 34 which protrude from the gear housing 1 have fitted thereon pulleys or chain sprockets which co-act with cables or chains for enabling the rotator to be manipulated from ground level. When manipulating the rotator, the gear housing will thus be stationary in relation to the mast, and consequently the cables, chains or like lines will not tangle together in the manner of the cables and chains used with prior art rotators of this kind.

Naturally, this system of pulleys and lines etc. may be replaced with electric motors connected to the shafts 28 and 34, said motors being connected to the gear housing in a fully sealed fashion.

In the aforegoing there has been described an activating means for displacing the rod 10 axially. As an alternative to this arrangement, the lower part of the rod 10 may comprise a rack which co-acts with a suitable mechanical device for displacement of the rod in the direction of its main axis. Furthermore, in accordance with another embodiment, the lower part 13 of the rod 10 may comprise, or be connected to the piston rod of a hydraulic piston-cylinder device. In this case, an electric motor and a hydraulic pump are connected to the housing 1.

Such modifications are embraced by the scope of the invention.

Thus, the present invention solves the aforementioned problems associated with known rotators and affords a simple, compact and weather durable revolver arrangement. It will be understood that the construction of the inventive rotator can be varied in many ways obvious to those skilled in this art.

Consequently, the present invention is not restricted to the described and illustrated embodiments, but can be modified within the scope of the following claims.

I claim:

1. A rotator comprising a gear housing which has a lower attachment for fitting the housing to the top of a mast, and which has extending therefrom a tube which can be rotated about its longitudinal axis relative to the gear housing by means of a gear therein, said tube being intended to carry a top sleeve, which in turn is intended to carry an aerial, characterized in that an upper attachment (3) is mounted on the outer end of the tube (5); in that the upper attachment (3) includes a lower part (6) which is connected firmly to the tube (5) and an upper part (7) which is hinged to the lower part (6); in that the tube (5) has located therewithin a rod (10) or like element which can be moved in the direction of the tube axis and is fixed against rotation with respect to said gear housing and the upper end of which rod (10) is attached to the upper part (7) of the upper attachment (3), such that when the rod (10) is moved axially the angle defined by the two attachment parts (6,7) with said longitudinal axis is changed; and in that the gear housing has provided therein activating means (18,19,26, 27) for displacing the rod (10) axially relative to the gear housing (1), therewith enabling a top sleeve (4) attached to the upper part (7) of the upper attachment (3) to be brought to a pre-determined angle with the tube (5) and enabling this angle to be maintained during rotation of the tube about its longitudinal axis, in that a drive shaft (28) for displacing said rod (10) and a drive shaft (34) for rotating said tube (5) are located in, and are stationary relative to, said gear housing and in that said gear housing is located stationary in relation to said mast.

2. A rotator according to claim 1, characterized in that the rod (10) includes a lower part (13) which is secured in the gear housing (1), an upper part (14) which is attached to the upper part (7) of the upper attachment (3), and an intermediate part (15), said parts (13, 14, 15) being mutually connected together by ball couplings (16, 17) or the like.

3. A rotator according to claim 2, characterized in that the lower rod part (13) located in the gear housing is screw-threaded; and in that said activating means includes an external rotatable sleeve (18) which is concentrical with the rod (10) and which carries a nut (19), the threads of which are intended to cooperate with the threads on the rod (10), said sleeve (18) being held against axial movement relative to the gear housing (1).

4. A rotator according to claim 3, characterized by a worm wheel (26) which is mounted externally on the sleeve (18) and which can be rotated by means of a worm screw (27), the shaft (28) of which is intended to be driven by a drive means for displacing the rod (10) in its axial direction (9).

5. A rotator according to claim 4, characterized in that the tube part located in the gear housing (1) has mounted thereon, concentrically with said tube, a worm wheel (32) which can be rotated by means of a worm screw (33), the shaft (34) of which is intended to be driven by a drive means such as to rotate the tube (5) and therewith the upper attachment (3).

* * * * *